(12) United States Patent
Zhang et al.

(10) Patent No.: US 11,707,778 B2
(45) Date of Patent: Jul. 25, 2023

(54) METHOD AND APPARATUS FOR MANUFACTURING EQUIAXED CRYSTAL ALUMINUM ALLOY CAST INGOT BY USING ADDITIVE MANUFACTURING AND RAPID SOLIDIFICATION TECHNIQUES

(71) Applicant: SHANGHAI JIAOTONG UNIVERSITY, Shanghai (CN)

(72) Inventors: Jiao Zhang, Shanghai (CN); Baode Sun, Shanghai (CN); Qing Dong, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 72 days.

(21) Appl. No.: 17/285,153

(22) PCT Filed: Nov. 7, 2018

(86) PCT No.: PCT/CN2018/114387
§ 371 (c)(1),
(2) Date: Apr. 14, 2021

(87) PCT Pub. No.: WO2020/093276
PCT Pub. Date: May 14, 2020

(65) Prior Publication Data
US 2021/0362224 A1    Nov. 25, 2021

(51) Int. Cl.
*B22D 23/00*   (2006.01)
*B22D 21/00*   (2006.01)
(Continued)

(52) U.S. Cl.
CPC ............ *B22D 23/003* (2013.01); *B22D 7/06* (2013.01); *B22D 21/007* (2013.01); *B22D 21/04* (2013.01);
(Continued)

(58) Field of Classification Search
CPC ..... B22D 21/007; B22D 23/003; B33Y 10/00
See application file for complete search history.

(56) References Cited

FOREIGN PATENT DOCUMENTS

| CN | 1401450 | 3/2003 |
|---|---|---|
| CN | 103736946 | 4/2014 |

(Continued)

OTHER PUBLICATIONS

Office Action issued in EP Application No. 18939460.4, dated Aug. 16, 2021.

(Continued)

*Primary Examiner* — Kevin E Yoon
(74) *Attorney, Agent, or Firm* — Hogan Lovells US LLP

(57) ABSTRACT

A method and apparatus for manufacturing an equiaxed crystal aluminum alloy cast ingot by using additive manufacturing and rapid solidification techniques are provided. The apparatus comprises: a metal heating mechanism and a negative pressure cooling mechanism. The metal heating mechanism is located above the negative pressure cooling mechanism and is connected thereto by a nozzle. The negative pressure cooling mechanism comprises a vacuum chamber having an air inlet hole and an air outlet hole, and a three-dimensional moving ingot mechanism disposed inside the vacuum chamber. The three-dimensional moving ingot mechanism comprises a moving ingot and a two-dimensional moving platform vertically connected to the moving ingot. A water cooling mechanism is disposed outside the moving ingot, and the moving ingot is driven by a precision motor to precisely move up and down.

1 Claim, 3 Drawing Sheets

(51) Int. Cl.
  *B33Y 10/00* (2015.01)
  *B22D 7/06* (2006.01)
  *B22D 21/04* (2006.01)
  *B22D 27/04* (2006.01)
  *B22D 27/15* (2006.01)
  *B22D 41/015* (2006.01)
  *B22D 41/08* (2006.01)
  *B22F 10/22* (2021.01)
  *B22F 12/10* (2021.01)
  *B22F 12/53* (2021.01)
  *B22F 12/70* (2021.01)
  *B22F 10/32* (2021.01)

(52) U.S. Cl.
  CPC ............ *B22D 27/04* (2013.01); *B22D 27/15* (2013.01); *B22D 41/015* (2013.01); *B22D 41/08* (2013.01); *B22F 10/22* (2021.01); *B22F 12/10* (2021.01); *B22F 12/53* (2021.01); *B22F 12/70* (2021.01); *B33Y 10/00* (2014.12); *B22F 10/32* (2021.01)

(56) References Cited

FOREIGN PATENT DOCUMENTS

| | | |
|---|---|---|
| CN | 104001906 | 8/2014 |
| CN | 106363920 | 2/2017 |
| CN | 108246993 | 7/2018 |
| CN | 108788102 | 11/2018 |
| JP | 6457965 | 3/1989 |
| KR | 1020090018522 A * | 2/2009 |

OTHER PUBLICATIONS

International Search Report and Written Opinion issued in PCT Application No. PCT/CN2018/114387 dated Jul. 16, 2019.

* cited by examiner

METHOD AND APPARATUS FOR MANUFACTURING EQUIAXED CRYSTAL ALUMINUM ALLOY CAST INGOT BY USING ADDITIVE MANUFACTURING AND RAPID SOLIDIFICATION TECHNIQUES

TECHNICAL FIELD

The present disclosure relates to a technology in the field of metallurgy, and in particular to a method and equipment for additive manufacturing of a fully-equiaxed crystalline aluminum alloy ingot by rapidly solidifying a melt.

BACKGROUND ART

A complete equiaxed crystal structure can hardly be obtained by casting a pure aluminum ingot or an aluminum alloy ingot with a conventional casting method due to the sequence of solidification. The alloy structure will always have a certain proportion of columnar crystals and thus will be less likely to obtain higher alloy properties by the subsequent deformation process. In addition, a large-sized cast metal ingot is susceptible to macroscopic element segregation from the edge to the center due to the segregation of main alloying elements on the liquid-solid interface, which seriously affects the quality of the cast ingot. It is extremely difficult to manufacture cast ingots with fully equiaxed crystals and without macro-segregation of elements by using traditional processes. A spray forming method can be used for manufacturing cast ingots without macro-segregation of components, but the aluminum ingots manufactured by this method have high porosity, have a non-dense structure, and are severely oxidized.

In the prior art, there is an additive manufacturing method using metal microdroplets, in which a wire is melted to form metal droplets and then the charged metal droplets are controlled under a magnetic field to be directly deposited and molded. However, the metal droplets are molded at low efficiency and cannot be used for production of large-sized cast ingots. Also, there is currently no method for forming a fully equiaxed crystal structure without segregation by generating negative pressure to spray a large volume of melt to form a stable continuous liquid metal column and rapidly condensing (cooling and solidifying) the same.

SUMMARY

In view of the disadvantages of the relatively complicated equipment and processes in the prior art in which high energy consumption is required and partial segregation can hardly be avoided so that it is difficult to manufacture cast ingots completely unsegregated from the macroscopic level to the microscopic level, the present disclosure proposes a method and apparatus for manufacturing a fully-equiaxed crystalline aluminum alloy cast ingot by using additive manufacturing and rapid solidification techniques, in which the atomization spray is replaced with a liquid injection process to increase the density of the alloy ingot, reduce the oxidation of the alloy ingot, and increase the efficiency of production of cast ingots, so that it is possible to rapidly manufacture cast ingots of aluminum and its alloys having more fine and uniform fully-equiaxed crystal structures from which macro-segregation is completely eliminated.

The present disclosure is implemented by the following technical solutions.

The present disclosure relates to an apparatus for manufacturing a fully-equiaxed crystalline aluminum alloy cast ingot by using additive manufacturing and rapid solidification techniques, comprising: a metal heating mechanism and a negative pressure cooling mechanism, wherein the metal heating mechanism is located above the negative pressure cooling mechanism and is connected thereto by a nozzle.

The metal heating mechanism comprises a crucible, a filter device, and a nozzle baffle sequentially arranged from top to bottom.

A heater and a thermal insulating layer are sequentially arranged at an outside of the crucible.

A nozzle heater configured for pre-heating is arranged at an outlet end of the nozzle.

The nozzle has a diameter of 0.2-10 mm.

The negative pressure cooling mechanism comprises a vacuum chamber with a gas inlet hole and a gas outlet hole (gas discharge hole), and a three-dimensional ingot moving mechanism arranged inside the vacuum chamber, wherein the three-dimensional moving ingot mechanism comprises a moving ingot and a two-dimensional moving platform vertically connected to the moving ingot, a water cooling mechanism is arranged outside the moving ingot, and the moving ingot is driven by a precision motor to be precisely displaced up and down.

The present disclosure relates to a method for manufacturing a fully-equiaxed crystalline aluminum alloy cast ingot by using additive manufacturing and rapid solidification techniques, wherein a heated molten metal is sprayed through a vertical nozzle onto a surface of a three-dimensionally movable moving ingot in a negative pressure environment, so that the molten metal is instantaneously condensed when it is in contact with the surface of the moving ingot, a crystalline layer with a thickness of $\delta$ is obtained by a horizontal planar movement of the moving ingot, and then the moving ingot is moved downward by a distance of $\delta$ and the planar movement is repeated to form a new crystalline layer, and the above process is repeated many times in an additive manner to obtain a cast ingot.

The molten metal refers to that obtained by heating and melting a molten metal in a crucible until it is completely melted.

In the heating, the temperature of the molten metal is increased by heating to its melting point and maintained for 0.5-1.5 hours.

The molten metal is preferably filtered, and the filtered aluminum liquid is placed in a thermally insulated launder for 0.5 to 1.5 hours and has a temperature adjusted to above the melting point of the metal.

The negative pressure refers to pressure lower than one standard atmosphere; a spraying speed and flow rate of the molten metal can be controlled by controlling a gas pressure difference.

The negative pressure is obtained preferably by firstly evacuating a vacuum chamber and then filling the vacuum chamber with an appropriate amount of argon gas to make the gas pressure in the vacuum chamber lower than one standard atmosphere.

The vertical nozzle is preferably subject to a preheating treatment, wherein a preheating temperature is higher than the melting point of the metal therein.

The distance between the moving ingot and the outlet of the nozzle, that is, the spraying distance D1 is ≤50 cm.

The vertical distance D2 between the moving ingot and the cooling surface is ≤10 cm.

The horizontal planar movement of the moving ingot is performed at a moving speed $v_1 \leq 1000$ mm/s at a pass spacing d≤20 mm/pass.

The moving ingot is, but not limited to, an aluminum ingot.

In the figures: 1 crucible, 2 heater, 3 thermal insulating cover, 4 filter device, 5 nozzle, 6 nozzle baffle, 7 nozzle heater, 8 vacuum chamber, 9 ingot guiding device, 10 two-dimensional moving platform, 11 precision motor, 12 gas inlet hole, 13 gas outlet hole, 14 vacuum pump, 15 connecting rod, 16 sleeve, 17 cooling medium, 18 moving ingot, 19 downward guiding device.

DETAILED DESCRIPTION OF EMBODIMENTS

Example 1

Figure 1:
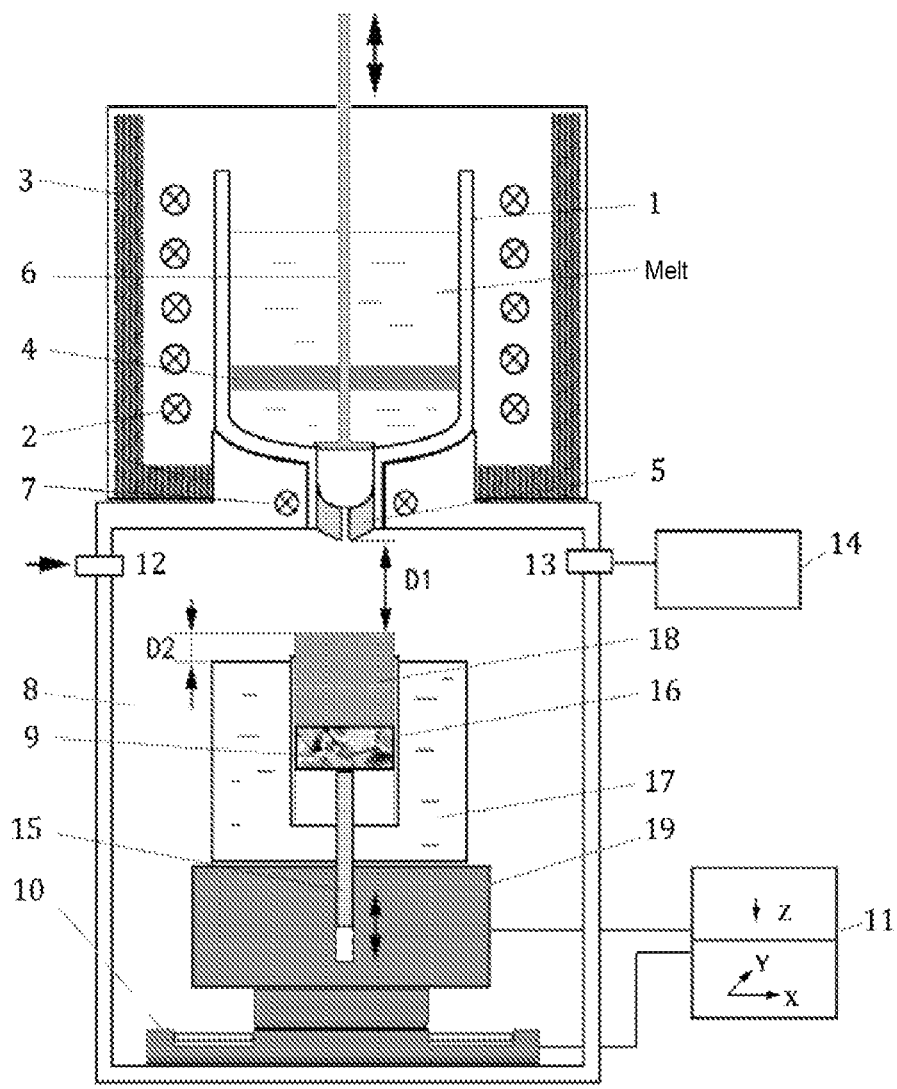
FIG. 1 is a schematic structural view of an apparatus of the present disclosure.
Figure 2:
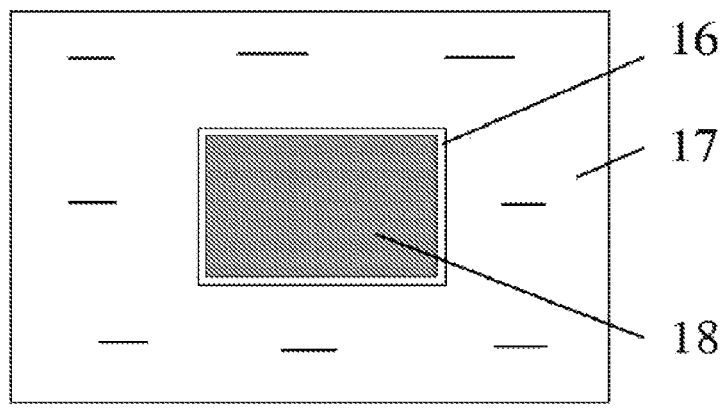
FIG. 2 is a top view of a contact surface and a cooling surface.

As shown in 1 and FIG. 2, an apparatus for manufacturing a fully-equiaxed crystalline aluminum alloy cast ingot by using additive manufacturing and rapid solidification techniques involved in this example comprises: a crucible 1, a heater 2, a thermal insulating cover 3, a filter device 4, a nozzle 5, a nozzle baffle 6, a nozzle heater 7, a vacuum chamber 8, an ingot guiding device 9, a two-dimensional moving platform 10, a motor 11, a gas inlet hole 12, a gas outlet hole 13, a vacuum pump 14, a connecting rod 15, a sleeve 16, a cooling medium 17, a moving ingot 18, and a downward guiding device 19.

Figure 3:
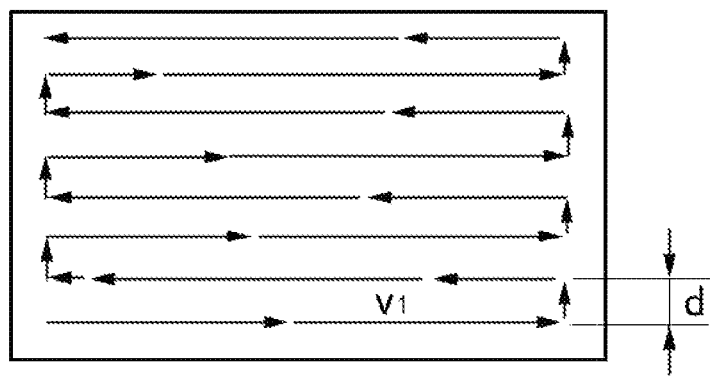
FIG. 3 is a top view of a cast ingot.

In this example, the above-mentioned apparatus is used in such a manner that a molten pure aluminum melt is poured into the crucible and then is left to stand for 0.5 to 1.5 hours, with the temperature thereof adjusted to 715° C. The vacuum chamber is evacuated or vacuumized and filled with an appropriate amount of argon gas to make the gas pressure in the vacuum chamber be 0.5 atmospheres, and the nozzle is preheated to a temperature of 720° C. The spray distance is set to be 18 cm, the vertical distance between the contact surface and the cooling surface is set to be 2.5 cm, and the two-dimensional moving platform is set to move at a speed of 5 mm/s at a pass spacing of 1.2 mm and move in a manner as shown in FIG. 3.

Figure 4:
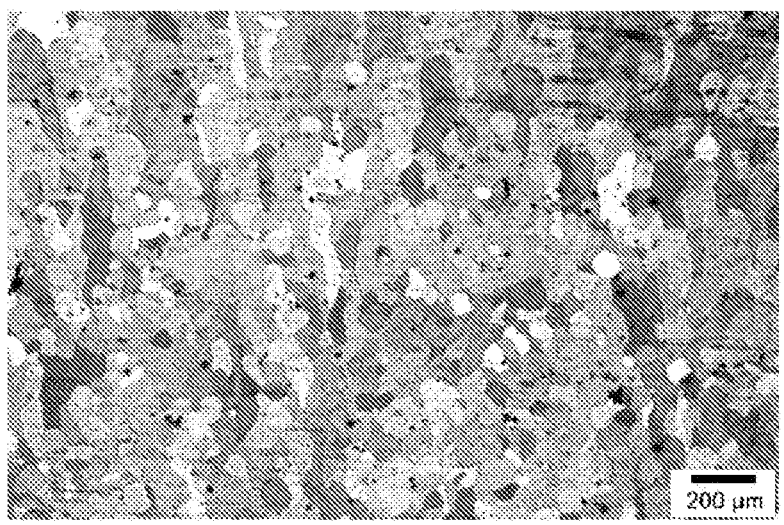
FIG. 4 shows a grain structure manufactured in Example 1.
Figure 5:
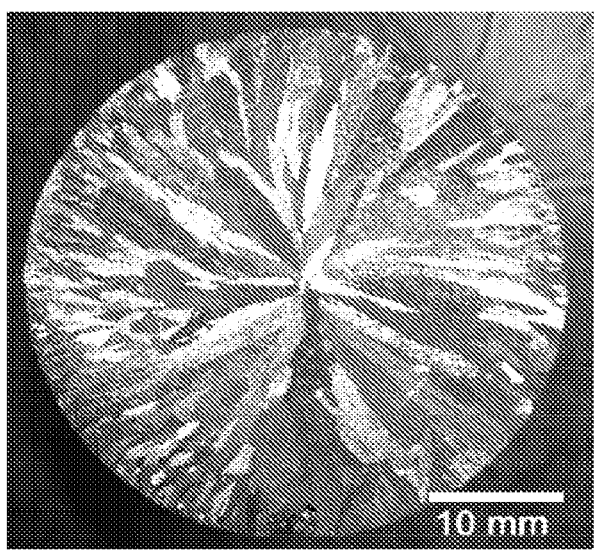
FIG. 5 shows a grain structure of pure aluminum obtained by an ordinary casting method.

The two-dimensional moving platform is set to have total displacements of X=100 mm, Y=100 mm, and Z=100 mm in the three directions, respectively. The nozzle baffle is raised up so that the aluminum liquid in the thermally insulated crucible is sprayed out from the nozzle under the action of the gas pressure difference, and at the same time the translation of the two-dimensional moving platform is started. When the aluminum liquid is sprayed onto the upper surface of the moving ingot which is moving, the aluminum liquid is condensed instantaneously under the cooling action. The two-dimensional moving platform is controlled to be translated leftward, rightward, frontward, and rearward, so that the crystallization is carried out on a rectangular plane to form a thin layer with a thickness of 1.2 mm. After the crystallization is completed, the ingot guiding head is moved downward by a distance of 1.2 mm. Then, the two-dimensional moving platform is repeatedly controlled to be translated leftward, rightward, frontward, and rearward so that a new crystalline layer is formed. A cubic cast ingot having a fully-equiaxed crystal structure without segregation can be manufactured by repeating this process. The finally obtained cubic cast ingot has a size of 100*100*100 mm. Its grain structure is shown in FIG. 4, and the grain structure of pure aluminum obtained by an ordinary casting method is shown in FIG. 5.

Example 2

Figure 6:
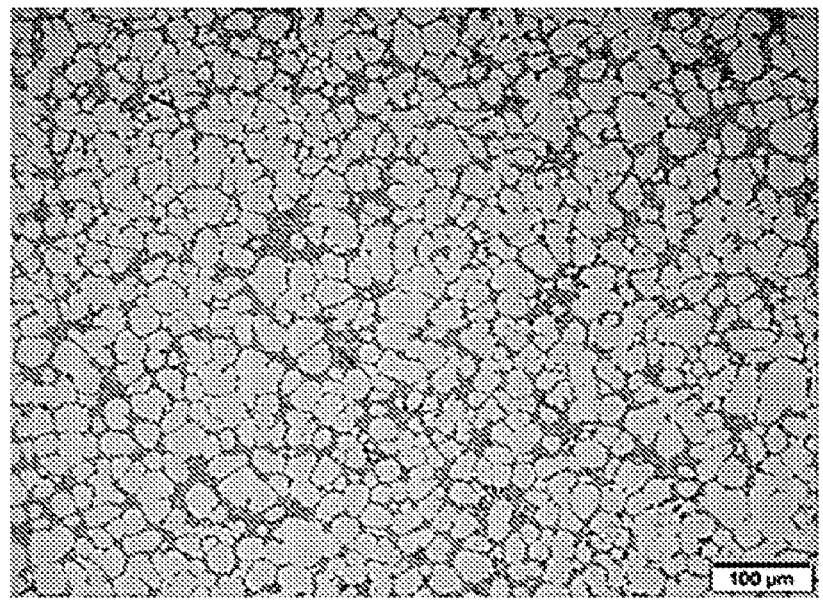
FIG. 6 shows a grain structure manufactured in Example 2.
Figure 7:
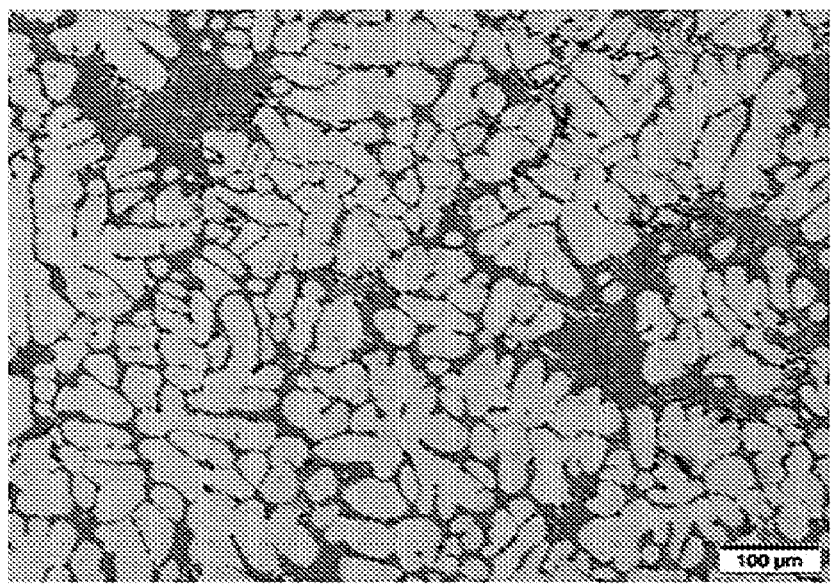
FIG. 7 shows a structure of an aluminum-silicon alloy obtained by an ordinary casting method.

In this example, the above-mentioned apparatus is used in such a manner that a molten aluminum-silicon alloy having a silicon content of 7% w.t. is poured into the crucible and then is left to stand for 0.5 to 1.5 hours, with the temperature thereof adjusted to 680° C. The vacuum chamber is evacuated or vacuumized and filled with an appropriate amount of argon gas to make the gas pressure in the vacuum chamber be 0.6 atmospheres, and the nozzle is preheated to a temperature of 700° C. The spray distance is set to be 15 cm, the vertical distance between the contact surface of the moving ingot and the cooling surface is set to be 2.5 cm, and the two-dimensional moving platform is set to move at a speed of 3.5 mm/s at a pass spacing of 0.8 mm and move in a manner as shown in FIG. 3. The two-dimensional moving platform is set to have total displacements of X=120 mm, Y=20 mm, and Z=80 mm in the three directions, respectively. The nozzle baffle is raised up so that the aluminum liquid in the thermally insulated crucible is sprayed out from the nozzle under the action of the gas pressure difference, and at the same time the translation of the two-dimensional moving platform is started. The aluminum liquid is sprayed onto the upper surface of the moving ingot which is moving, and is condensed instantaneously under the cooling action. The two-dimensional moving platform is controlled to be translated leftward, rightward, frontward, and rearward, so that the crystallization is carried out on a rectangular plane to form a thin layer with a thickness of 0.8 mm. After the crystallization is completed, the ingot guiding head is moved downward by a distance of 0.8 mm. Then, the two-dimensional moving platform is repeatedly controlled to be translated leftward, rightward, frontward, and rearward so that a new crystalline layer is formed. An square flat ingot having a fully-equiaxed crystal structure without segregation can be manufactured by repeating this process. The finally obtained square flat ingot has a size of 120*20*80 mm. Its grain structure is shown in FIG. 6, and the structure of an aluminum-silicon alloy obtained by an ordinary casting method is shown in FIG. 7.

The above specific embodiments may be partially adjusted by those skilled in the art in different ways without departing from the principle and spirit of the present disclosure. The scope of protection of the present disclosure is defined by the claims and is not limited by the above specific embodiments. All the embodiments falling within its scope are bound by the present disclosure.

What is claimed is:

1. A method for manufacturing a fully-equiaxed crystalline aluminum alloy cast ingot by using additive manufacturing and rapid solidification techniques, the method comprising:

using an apparatus, the apparatus comprising a metal heating mechanism and a negative pressure cooling mechanism, wherein the metal heating mechanism is located above the negative pressure cooling mechanism and is connected to the negative pressure cooling mechanism by a nozzle (5); and the negative pressure cooling mechanism comprises a vacuum chamber with a gas inlet hole (12) and a gas outlet hole (13), and a three-dimensional moving ingot mechanism arranged inside the vacuum chamber, wherein the three-dimensional moving ingot mechanism comprises a moving ingot (18) and a two-dimensional moving platform (10) vertically connected to the moving ingot (18), a water cooling mechanism is arranged outside the moving ingot (18), and the moving ingot (18) is configured to be driven by a precision motor (11) to be precisely displaced up and down, wherein the metal heating mechanism comprises a crucible, a filter device, and a nozzle baffle sequentially arranged from top to bottom, a heater and a thermal insulating layer are sequentially arranged at an outside of the crucible, and a nozzle heater configured for pre-heating is arranged at an outlet end of the nozzle, wherein the apparatus is used in such a manner that a molten metal is obtained by heating and melting a metal block in the crucible (1) until the metal block is completely melted, wherein the temperature of the molten metal is increased by heating to its melting point and maintained for 0.5-1.5 hours in the heating, the vacuum chamber is evacuated and then the vacuum chamber is filled with an appropriate amount of argon gas to make the gas pressure in the vacuum chamber lower than one standard atmosphere to provide a negative pressure environment, the vertical nozzle is subject to a preheating treatment, wherein a preheating temperature is higher than the melting point of the metal therein, a distance (D1) between the moving ingot and the outlet of the nozzle is set to be $0<D1\leq50$ cm, and a vertical distance (D2) between the contact surface and the cooling surface is set to be $0<D2\leq10$ cm, the heated molten metal is sprayed through a vertical nozzle onto a surface of the three-dimensionally movable moving ingot in the negative pressure environment, so that the molten metal is condensed when in contact with the surface of the moving ingot, a crystalline layer is obtained by a horizontal planar movement of the moving ingot at a moving speed v1, wherein the crystalline layer has a thickness of δ, the moving speed v1 is set to be $0<v1\leq1000$ mm/s, and a pass spacing d is set to be $0<d\leq20$ mm/pass, and then the moving ingot (18) is downward moved by a distance of δ and the planar movement thereof is repeated to form a new crystalline layer, which are repeated many times to obtain the cast ingot.

\* \* \* \* \*